US009736985B2

(12) United States Patent
Vandevelde et al.

(10) Patent No.: US 9,736,985 B2
(45) Date of Patent: Aug. 22, 2017

(54) AGRICULTURAL HARVESTER AUGER ASSEMBLY

(71) Applicant: CNH Industrial America LLC, New Holland, PA (US)

(72) Inventors: Pieter Vandevelde, Sint Michiels Brugge (BE); Daniel T. Turner, Lititz, PA (US); Karl R. Linde, Leola, PA (US); Eric E. Veikle, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/700,859

(22) Filed: Apr. 30, 2015

(65) Prior Publication Data
US 2016/0316632 A1    Nov. 3, 2016

(51) Int. Cl.
*A01D 17/02* (2006.01)
*A01F 12/46* (2006.01)
*A01F 12/44* (2006.01)

(52) U.S. Cl.
CPC ............ *A01F 12/46* (2013.01); *A01F 12/444* (2013.01)

(58) Field of Classification Search
CPC . A01F 12/46; B65G 33/24; B65G 2812/0544; B65G 2812/0561; B65G 33/00; B65G 65/46; A01K 5/0258; G01F 13/005
USPC ............... 198/671, 670, 860.5; 460/114, 119
See application file for complete search history.

(56) References Cited

U.S. PATENT DOCUMENTS

| 1,382,901 | A | * | 6/1921 | Gebhardt ................ A01F 12/52 209/257 |
| 3,070,221 | A | | 12/1962 | Bobrowski |
| 3,268,067 | A | | 8/1966 | Prentice et al. |
| 3,568,863 | A | | 3/1971 | Rohwedder et al. |
| 3,580,257 | A | * | 5/1971 | Teague ............... A01D 41/1208 460/1 |
| 3,760,813 | A | * | 9/1973 | Mathews ................ A01D 41/02 460/119 |
| 4,067,343 | A | * | 1/1978 | Muijs ..................... A01D 41/12 198/642 |
| 4,800,902 | A | * | 1/1989 | Maust ................ A01D 41/1208 460/114 |
| 5,333,762 | A | | 8/1994 | Andrews |
| 5,380,247 | A | * | 1/1995 | Underwood ....... A01D 41/1208 460/114 |

(Continued)

FOREIGN PATENT DOCUMENTS

DE          3502014 A1   7/1986
GB          1 281 304 A  7/1972
(Continued)

Primary Examiner — Árpád Fábián-Kovács
(74) Attorney, Agent, or Firm — Patrick M. Sheldrake

(57) ABSTRACT

An agricultural harvester includes an auger assembly including an auger having an auger shaft defining an axis of rotation and a flighting carried by the auger shaft, the auger being configured to rotate the flighting in a sweeping path about the axis of rotation; and an auger trough placed adjacent to the auger to hold crop material in the sweeping path and having a bottom below the sweeping path. The auger trough has a first portion on a first side of the bottom and a second portion on a second side opposite the first side of the bottom, with the second portion of the auger trough having an end directed toward the first portion in a direction of the sweeping path.

12 Claims, 4 Drawing Sheets

(56) References Cited

U.S. PATENT DOCUMENTS

| | | | | |
|---|---|---|---|---|
| 5,443,352 | A * | 8/1995 | Schuhmacher | A01D 41/1208 198/550.01 |
| 5,496,215 | A * | 3/1996 | Underwood | A01D 41/1208 460/114 |
| 5,498,206 | A * | 3/1996 | Underwood | A01F 12/52 460/119 |
| 5,615,989 | A | 4/1997 | Matousek et al. | |
| 5,863,247 | A * | 1/1999 | Behnke | A01D 41/1271 460/114 |
| 6,102,795 | A * | 8/2000 | Behrens | A01D 41/1208 414/502 |
| 6,350,197 | B1 * | 2/2002 | Cooksey | A01F 12/46 460/114 |
| 6,358,143 | B1 * | 3/2002 | Hurlburt | A01D 41/1217 414/502 |
| 6,367,234 | B1 * | 4/2002 | Hurlburt | A01D 41/1217 460/114 |
| 6,669,558 | B1 * | 12/2003 | Wolters | A01F 12/52 460/114 |
| 6,974,384 | B2 * | 12/2005 | Schmidt | A01F 12/52 460/114 |
| 7,833,091 | B2 * | 11/2010 | Holtmann | A01D 41/12 460/114 |
| 7,857,120 | B1 | 12/2010 | Perring et al. | |
| 8,007,353 | B1 * | 8/2011 | Werning | A01F 12/46 460/13 |
| 8,801,514 | B1 * | 8/2014 | McCully | A01F 12/46 198/801 |
| 2010/0300846 | A1 * | 12/2010 | Marchesini | B65G 33/32 198/671 |
| 2014/0329572 | A1 * | 11/2014 | McCully | A01F 12/46 460/114 |

FOREIGN PATENT DOCUMENTS

| | | |
|---|---|---|
| GB | 1 406 265 A | 9/1975 |
| JP | S6145817 A | 3/1986 |

\* cited by examiner

AGRICULTURAL HARVESTER AUGER ASSEMBLY

BACKGROUND OF THE INVENTION

1. Field of the Invention

The present invention relates to agricultural harvesters, and, more particularly, to troughs for an auger of an agricultural auger.

2. Description of the Related Art

Combines are used to harvest agricultural crops such as corn, soybeans, wheat and other grain crops. As the combine is driven through crop fields, the combine cuts the crop, separates the desired crop from the undesired waste, stores the crop, and discards the waste.

In a typical combine, a header is mounted to the front of the combine to gather the crop and feed the crop into the combine for processing. As the combine is driven through the field, the crop material is collected by the header and deposited into a feeder housing. The crop material is then transported upwardly and into the combine by a feed elevator located within the feeder housing. The crop material then passes through a threshing and separating mechanism. In a rotary combine, the threshing and separating mechanism includes a rotor, a threshing concave, a rotor cage, and a separating grate. As crop material passes between the rotor, the threshing concave and the separating grate, the crop material is impacted and/or rubbed, thereby causing the grain to separate from the stalk material. The stalk material that is separated from the grain is commonly referred to as material other than grain (MOG). Other types of combines are also known that perform similar functions using different mechanisms.

After passing through the threshing and separating assembly, the grain and MOG are deposited onto a grain cleaning system. The grain cleaning system of a typical combine includes a plurality of adjustable cleaning sieves, often referred to as a chaffer sieve and a shoe sieve. The sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a grain elevator and deposited into a storage tank or grain tank. Other systems also exist that can utilize, for example, a loop conveyor system which eliminates the need for a conventional cross auger.

One way to increase the efficiency of a combine is to reduce the weight of the combine, which lowers the power requirements for driving the combine. The auger and associated auger trough of the combine are attractive candidates for weight reduction, since they have relatively simple parts compared to other systems of the combine and can include a relatively large amount of heavy materials, such as sheet metal. If the size of the auger and auger trough could be effectively reduced, the weight savings could be significant and the smaller auger would allow for the functional components to be placed closer together, allowing a combine of similar capacity to be packaged in a smaller volume. One problem with reducing the size of the auger and auger trough is that this can reduce the crop material transporting capacity of the auger, which reduces the output of the combine. Further, the auger and auger trough can be placed close to components, such as the cleaning fan, in the combine that create pressurized gas streams. Placing an open-troughed auger too close to the cleaning fan discharge reduces the cleaning capacity of the combine due to the amount of material that is thrown from the auger into the cleaning fan outlet. Placing an open trough auger closer to the cleaning fan discharge will therefore decrease the capacity of the combine.

What is needed in the art is a way to reduce the weight of the auger and auger trough while overcoming some of the previously described disadvantages.

SUMMARY OF THE INVENTION

The present invention provides an agricultural harvester including an auger assembly with an auger and an auger trough that has a first portion and a second portion with an end directed toward the first portion.

The invention in one form is directed to an agricultural harvester including a chassis; a cleaning system carried by the chassis that is configured to clean crop material; a crop material elevator carried by the chassis that is supplied with cleaned crop material from the cleaning system; and an auger assembly carried by the chassis that is configured to supply cleaned crop material from the cleaning system to the crop material elevator. The auger assembly includes an auger having an auger shaft defining an axis of rotation and a flighting carried by the auger shaft, the auger being configured to rotate the flighting in a sweeping path about the axis of rotation and supply cleaned crop material toward the crop material elevator; and an auger trough placed adjacent to the auger to hold crop material in the sweeping path and having a bottom below the sweeping path. The auger trough has a first portion on a first side of the bottom and a second portion on a second side opposite the first side of the bottom, with the second portion of the auger trough having an end directed toward the first portion in a direction of the sweeping path.

The invention in another form is directed to an auger assembly including an auger having an auger shaft defining an axis of rotation and a flighting carried by the auger shaft, the auger being configured to rotate the flighting in a sweeping path about the axis of rotation; and an auger trough placed adjacent to the auger to hold crop material in the sweeping path and having a bottom below the sweeping path. The auger trough has a first portion on a first side of the bottom and a second portion on a second side opposite the first side of the bottom, with the second portion of the auger trough having an end directed toward the first portion in a direction of the sweeping path.

An advantage of the present invention is that the second portion of the auger trough can increase the fill efficiency of the auger thereby allowing for a smaller auger to be used to transport the same amount of crop material.

Another advantage is the second portion of the auger trough can shield transported crop material from being thrown into the air stream generated by the cleaning fan, allowing for the auger to be placed closer to the cleaning fan discharge and ultimately reducing the volumetric and weight requirements of the combine.

Yet another advantage is the first portion can be configured so that crop material outside the sweeping path of the flighting can be transported toward the crop material elevator.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
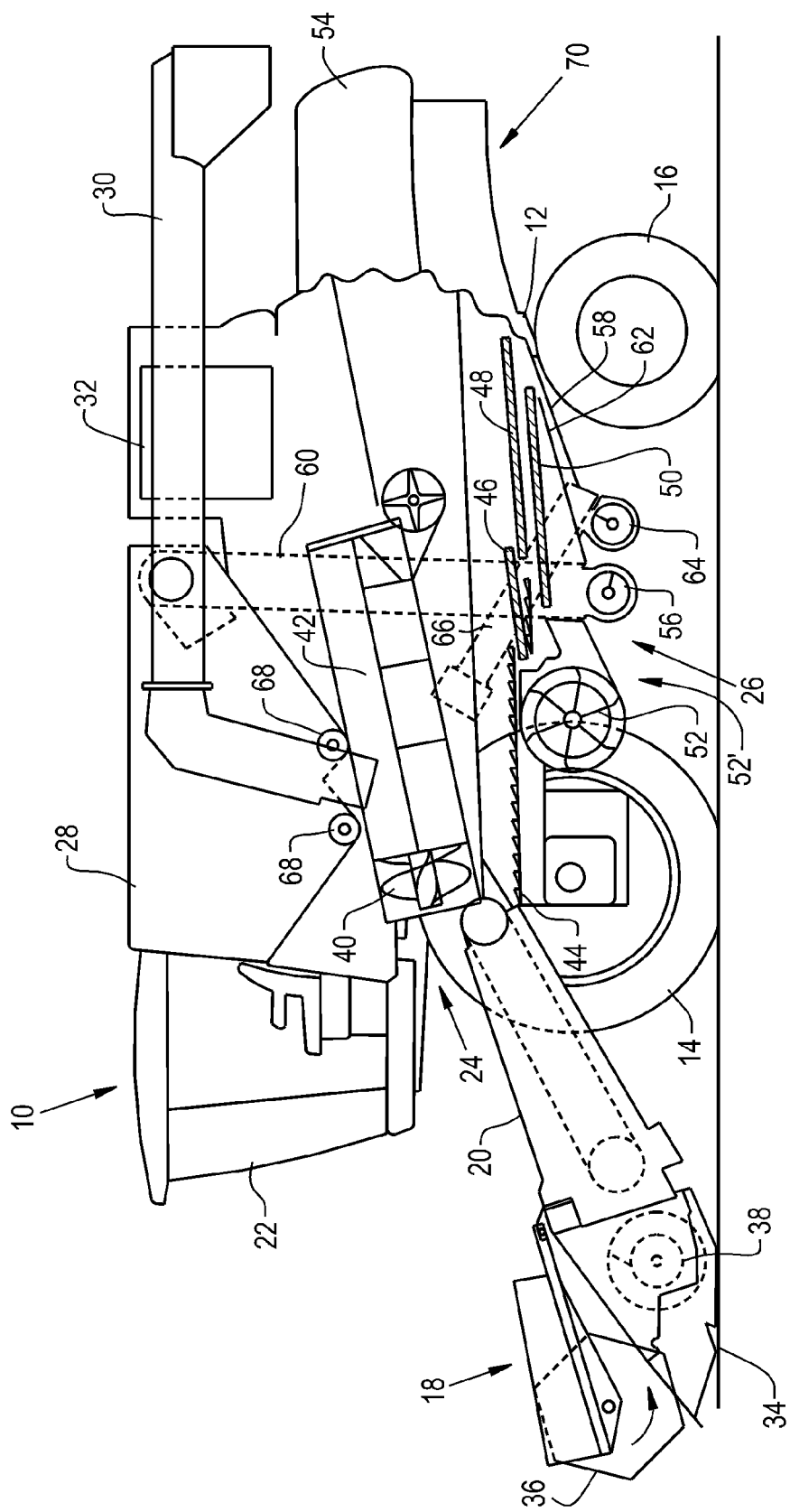
FIG. 1 is a side view of an embodiment of an agricultural harvester according to the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30. It should be appreciated that while the agricultural harvester is shown as combine 10, the agricultural harvester according to the present invention can be any type of construction that allows for crop material to be harvested such as a conventional combine (which does not have a rotor), rotary combine, hybrid combine, chopper harvester, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 62 of cleaning system 26. Clean grain auger 56 conveys the clean grain laterally to a generally vertically arranged elevator 60, which can also be referred to as a grain elevator, for transport to grain tank 28. Tailings from cleaning system 26 fall to a tailings auger on 58. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 may include a chopper, counter knives, a windrow door and a residue spreader.

Figure 2:
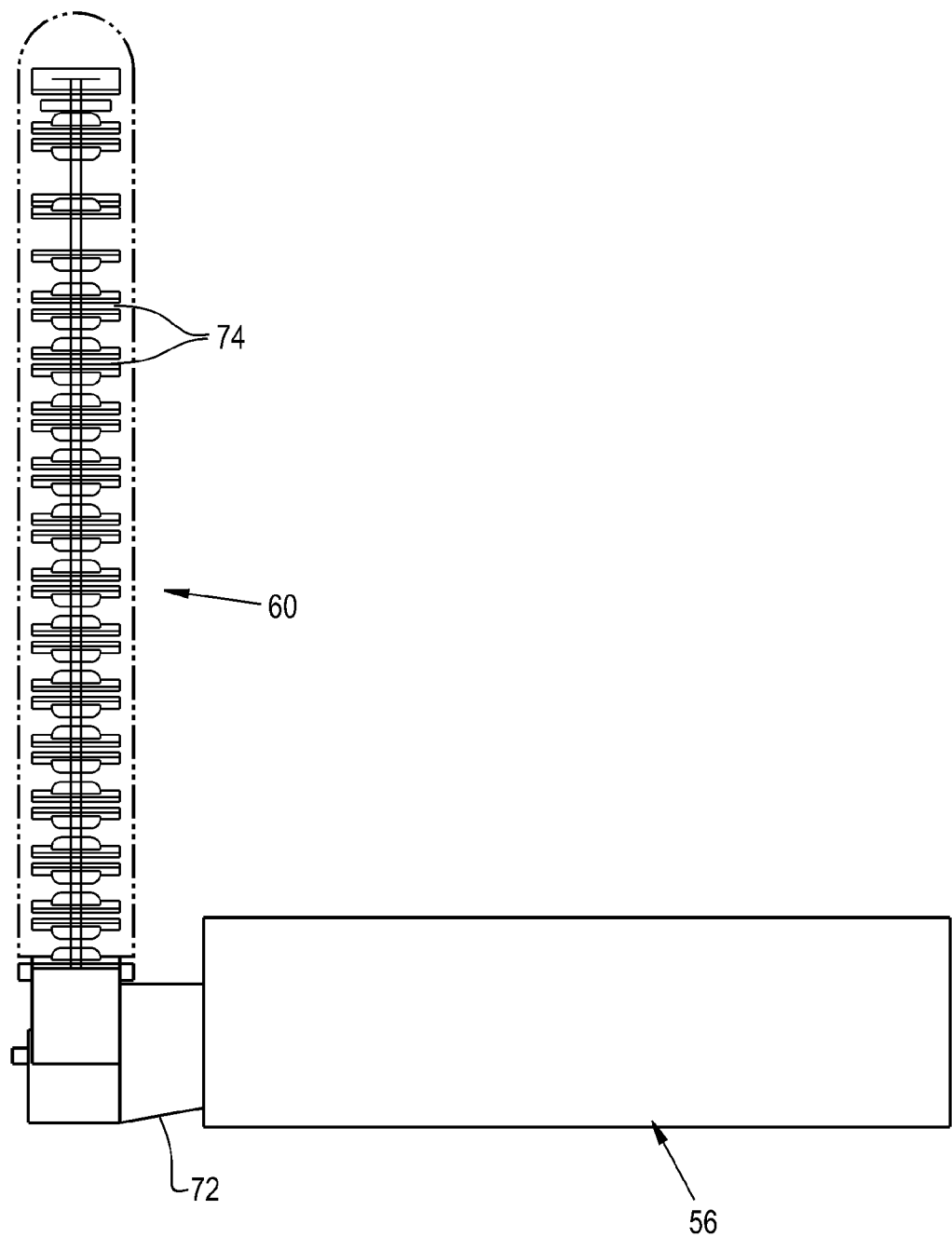
FIG. 2 is a cutaway perspective view of a portion of the agricultural harvester shown in FIG. 1, showing an auger assembly connected to a crop material elevator.

Referring now to FIG. 2, a portion of the agricultural harvester 10 with the elevator 60 is shown in better detail. The crop material is supplied to the elevator 60 from the cleaning system 26 (shown in FIG. 1) by the clean grain auger 56, which can also be referred to as an auger assembly and is shown generically as a block in FIG. 2 for ease of illustration. As shown, the clean grain auger 56 can direct cleaned crop material toward an inlet 72 of the elevator 60 so that cleaned grain can be raised by paddles 74 inside the elevator 60. It should be appreciated that the elevator 60 can be supplied with crop material from more than one auger, but only one auger is illustrated for ease of description, and that the elevator 60 can have any construction suitable for moving crop material in an upward direction.

Figure 3:
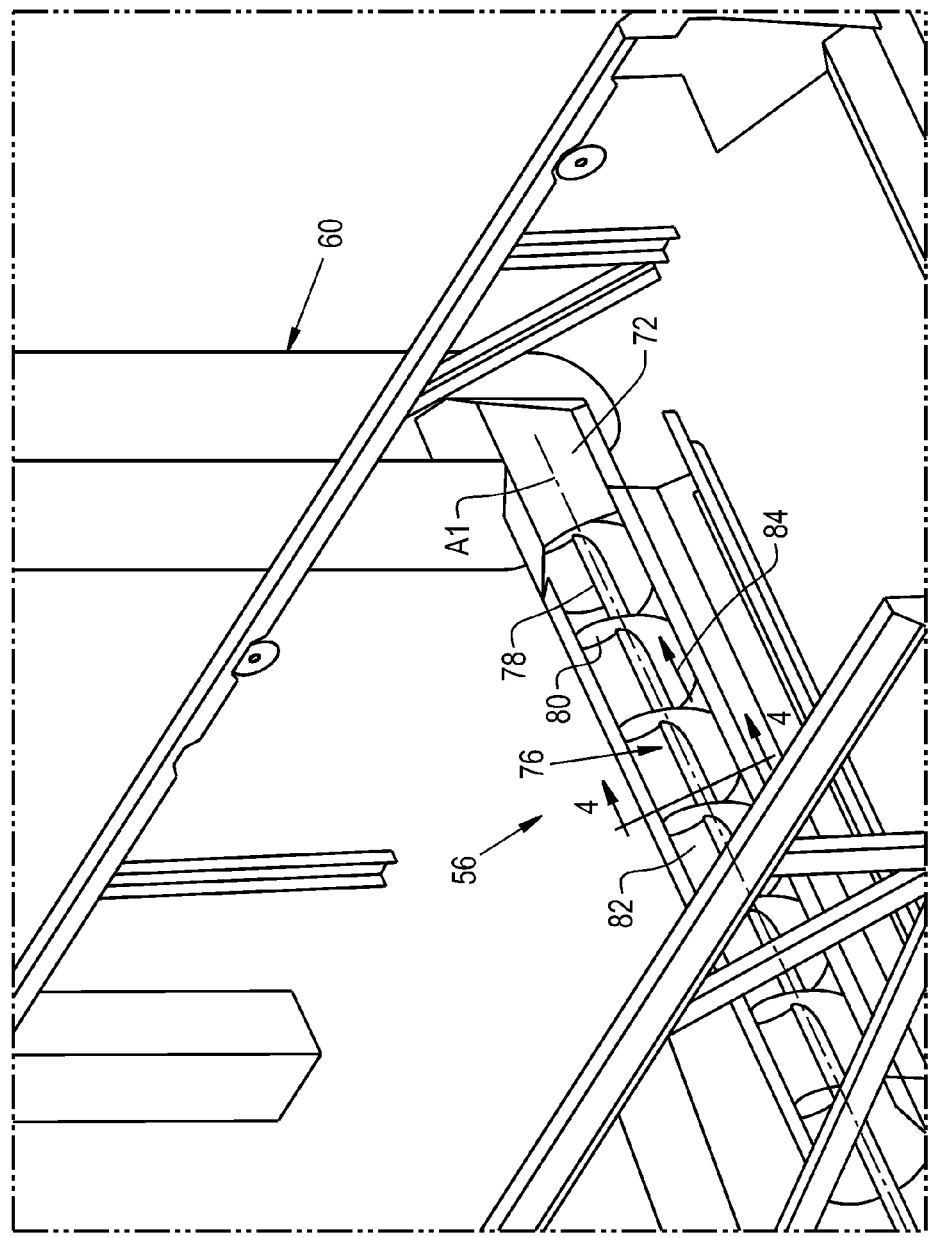
FIG. 3 is a perspective view of an embodiment of an auger assembly according to the present invention.

Referring now to FIG. 3, the auger assembly 56 supplying clean grain to the elevator 60 is shown in better detail and generally includes an auger 76 with an auger shaft 78 and a flighting 80 carried by the auger shaft 78 and an auger trough 82 placed adjacent to the auger 76. It should be appreciated that while the auger assembly 56 is referred to as supplying clean grain to the elevator 60, the auger assembly 56 can be used to convey any type of crop material. The auger shaft 78 defines an axis of rotation A1 and is driven so that the auger shaft 78 rotates about the axis of rotation A1. As shown, the auger shaft 78 can rotate in the clock-wise direction so that the carried flighting 80 defines a sweeping path as it is rotated by the auger shaft 78. As used herein, the "sweeping path" refers to areas within the auger assembly 56 where the flighting 80 will travel as the auger shaft 78 rotates and can directly contact crop material held in the auger trough 82 to convey the crop material in a conveyance direction, designated as arrow 84, toward the elevator 60. The sweeping path, therefore, can generally encompass a circle defined about the auger shaft 78 with a radius equal to the distance of the flighting's 80 farthest point from the auger shaft 78. The auger 76 can be configured as any type of auger that is suitable for supplying crop material to the elevator 60 and for the conveyance demands of the agricultural harvester 10.

Figure 4:
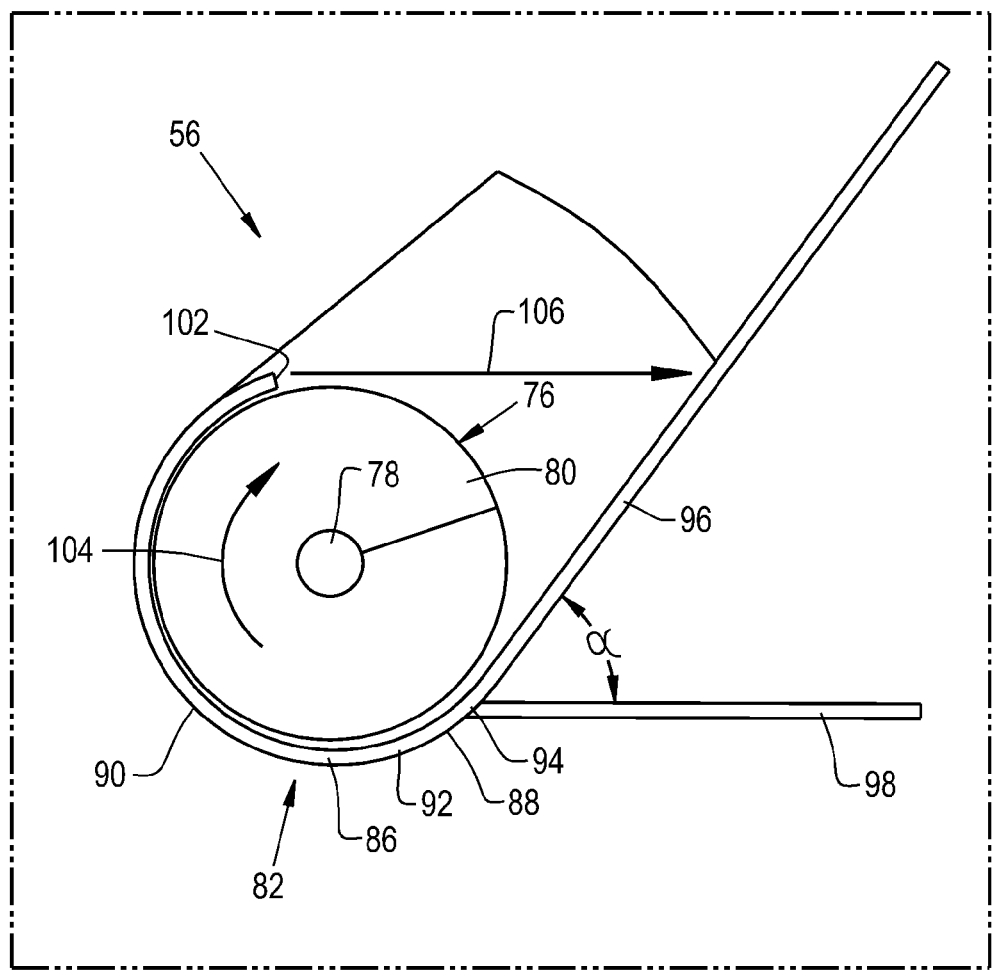
FIG. 4 is a cross-sectional view of the auger assembly shown in FIG. 3 taken along line 4-4.

Referring now to FIG. 4, a cross-section through the auger assembly 56 is shown that better illustrates the structure of the auger trough 82. As can be seen, the auger trough 82 is adjacent to the auger 76 so that the auger trough 82 can hold crop material in the sweeping path of the flighting 80, allowing crop material held in the auger trough 82 to be conveyed toward the elevator 60. The auger trough 82 has a bottom 86 below the sweeping path where crop material dropped into the auger trough 82 will tend to accumulate due to gravitational force. The auger trough 82 has a first portion 88 formed on one side of the bottom 86 and a second portion 90 formed on the other side of the bottom 86 opposite the first portion 88, the significance of which will be discussed further herein. The auger trough 82 can be formed of a variety of materials, such as sheet metal or polymers, that can handle bearing the weight of crop material held in the auger trough 82.

As can be seen in FIG. 4, the first portion 88 can have an arced section 92 immediately adjacent to the bottom 86 that has an end 94, with another section 96, shown as a planar section, connected to the end 94 of the arced section 92. It should be appreciated that while the other section 96 is shown as a planar section, it is contemplated that the other section 96 can also be curved or be formed as multiple planar sections together. A horizontal line 98 can be drawn at the end 94 of the arced section 92 where the planar section 96 is connected to form a horizontal 98 of the end 94 of the arced section 92, defining an angle α between the horizontal 98 and the planar section 96. The angle α can be chosen so that the auger trough 82 holds crop material in the sweeping path, while also allowing crop material that is not in the sweeping path to be conveyed toward the elevator 60 due to friction holding moving crop material in the sweeping path and crop material out of the sweeping path together as the crop material in the sweeping path is conveyed toward the elevator 60. Any suitable value of angle α can be chosen, depending on the configuration of the auger trough 82. When the first portion 88 includes a planar section 96, the angle α can be between 50 and 60 degrees, such as 55 degrees as shown in FIG. 4, which has been found to produce a first portion 88 that allows moving crop material in the sweeping path to drag crop material out of the sweeping path toward the elevator 60.

The second portion 90 is on the side of the bottom 86 opposite the first portion 88 and includes an end 102 that is directed toward the first portion 88 in a direction of the sweeping path. It should be appreciated that the end 102 of the second portion 90 referred to as being directed toward the first portion 88 in a direction of the sweeping path is not referring to either of the lateral ends of the auger trough 82 defining the length of the auger trough 82 therebetween. As can be seen in FIG. 4, an overall direction of the sweeping path, designated by arrow 104, is clockwise and corresponds to the rotational direction of the auger shaft 78 and carried flighting 80. It should be appreciated that the direction of the sweeping path 104 can be defined as infinitely many pairs of vertical and horizontal directions combined to create a clockwise rotation about the axis of rotation A1. As the flighting 80 is carried by the auger shaft 78 through the sweeping path, crop material held in the auger trough 82 is picked up by the flighting 80 and rotated about the axis of rotation A1 defined by the auger shaft 78 to move in the conveying direction 84 toward the elevator 60. As the crop material rotates, it can be "flung" away from the flighting 80. By having the end 102 of the second portion 90 directed toward the first portion 88 in a direction of the sweeping path, such as in a direction designated as arrow 106 in FIG. 4, the "flung" crop material can be re-directed toward the first portion 88 and bottom 86 of the auger trough 82 to prevent crop material escape from the auger assembly 56. It should be appreciated that if the overall direction of the sweeping path 104 were reversed in comparison to FIG. 4, the shape of the auger trough 82 could be mirrored to that shown in FIG. 4 to re-direct the "flung" crop material. Section 90 starting from the bottom 86 to the end 102 improves the fill efficiency of the auger 76 on its own. The crop conveying capacity of the auger 76 is further increased by the frictional forces between the crop in the swept area of the flighting 80 and the crop material on section 96. An auger trough of this design results in an increased transport capacity compared to an open trough design with the auger operating at the same speed. Further, this auger trough 82 has the advantage of preventing crop material from being expelled from the auger 76 regardless of the speed of the auger 76. Put differently, the transport capacity of the auger assembly 56 can be increased without the negative implications that a "standard" open trough auger assembly has, namely the expulsion of crop material into the cleaning fan 52's discharge. Directing the end 102 of the second portion 90 toward the first portion 88 can therefore prevent crop material from being undesirably blown around by adjacent pressurized gas streams.

As shown in FIG. 4, the entirety of second portion 90 can define an arc defined about the axis of rotation A1 that has end 102 directed toward the first portion 88, but it is contemplated that the second portion 90 can assume other shapes with an end directed toward the first portion 88 that are not curved. When the first portion 88 has an arced section 92 immediately adjacent the bottom 86 and the second portion 90 defines an arc about the axis of rotation A1, the second portion 90 and arced section 92 can together form a continuous arc defined about the axis of rotation A1 that extends from the end 94 of the arced section 92 to the end 102 of the second portion 90. The continuous arc can extend 180 degrees or more, relative to the axis of rotation A1, such that the continuous arc partially "wraps" around the sweeping path of the flighting 80 and the end 102 of the second portion 90 is directed toward the first portion 88. The second portion 90 can account for at least half of the entire arc extension (90 degrees relative to the axis of rotation A1) so that the end 102 of the second portion 90 curves back and is directed toward the first portion 88. If the first portion 88 does not have an arced shape, the second portion 90 can define an arc about the axis of rotation A1 extending from the bottom 86 of the auger trough 82 to the end 102 of the second portion 90 and extending at least 90 degrees relative to the axis of rotation A1 so that the end 102 of the second portion 90 curves back and is directed toward the first portion 88. It should be appreciated that while the arced section 92 and second portion 90 are shown as forming a single, continuous arc, one or both of the first portion 88 and second portion 90 can have one or more arced sections defined about the axis of rotation A1 with the same or differing curvatures relative to the axis of rotation A1.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
a chassis;
a cleaning system carried by said chassis and configured to clean crop material, said cleaning system including at least one sieve;
a crop material elevator carried by said chassis and supplied with cleaned crop material from said cleaning system; and
an auger assembly carried by said chassis and configured to supply cleaned crop material from said cleaning system to said crop material elevator, said auger assembly including:
an auger having an auger shaft defining an axis of rotation and a flighting carried by said auger shaft, said auger being configured to rotate said flighting in a sweeping path about said axis of rotation and convey cleaned crop material toward said crop material elevator; and
an auger trough placed adjacent to said auger to hold crop material in said sweeping path and having a bottom below said sweeping path and said at least one sieve of said cleaning system, said auger trough having a first portion on a first side of said bottom and a second portion on a second side opposite said first side of said bottom, said second portion of said auger trough having an end which is directed toward said first portion in a direction of said sweeping path and is higher than said axis of rotation, said first portion of said auger trough being positioned so as to receive cleaned crop material which falls from said at least one sieve.

2. The agricultural harvester according to claim 1, wherein at least one of said first portion and said second portion at least partially defines an arc that is defined about said axis of rotation.

3. The agricultural harvester according to claim 2, wherein said arc extends at least 180 degrees about said axis of rotation.

4. The agricultural harvester according to claim 1, wherein said first portion includes an arced section defined by at least one arc defined about said axis of rotation.

5. The agricultural harvester according to claim 4, wherein said arced section defines an end, said first portion including a planar section connected to said end of said arced section.

6. The agricultural harvester according to claim 5, wherein said planar section extends at an angle defined relative to a horizontal of said end of said arced section.

7. The agricultural harvester according to claim 6, wherein said angle is between 50 and 60 degrees relative to said horizontal of said end of said arced section.

8. The agricultural harvester according to claim 7, wherein said angle is 55 degrees relative to said horizontal of said end of said arced section.

9. The agricultural harvester according to claim 5, wherein said end of said second portion is directed toward said planar section in said direction of said sweeping path.

10. The agricultural harvester according to claim 1, wherein said second portion defines at least one arc defined about said axis of rotation.

11. The agricultural harvester according to claim 10, wherein said arc extends at least 90 degrees about said axis of rotation.

12. The agricultural harvester according to claim 1, wherein said cleaning system includes a cleaning fan directed toward said at least one sieve and which is configured to direct an air stream through said at least one sieve, said second portion of said auger trough preventing crop material from being thrown into the air stream directed by said cleaning fan during rotation of said flighting.

* * * * *